US012100295B2

(12) United States Patent
Sakurada et al.

(10) Patent No.: US 12,100,295 B2
(45) Date of Patent: Sep. 24, 2024

(54) CONTROL DEVICE AND PEDESTRIAN SUPPORT METHOD

(71) Applicant: TOYOTA JIDOSHA KABUSHIKI KAISHA, Toyota (JP)

(72) Inventors: Shin Sakurada, Toyota (JP); Shota Minami, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 17/813,422

(22) Filed: Jul. 19, 2022

(65) Prior Publication Data

US 2023/0056153 A1 Feb. 23, 2023

(30) Foreign Application Priority Data

Aug. 19, 2021 (JP) ................................ 2021-134392

(51) Int. Cl.

| | |
|---|---|
| ***G08G 1/005*** | (2006.01) |
| ***G08G 1/01*** | (2006.01) |
| ***G08G 1/056*** | (2006.01) |
| ***G08G 1/16*** | (2006.01) |

(52) U.S. Cl.

CPC ........... *G08G 1/005* (2013.01); *G08G 1/0141* (2013.01); *G08G 1/0145* (2013.01); *G08G 1/056* (2013.01); *G08G 1/164* (2013.01); *G08G 1/166* (2013.01); *G08G 1/167* (2013.01)

(58) Field of Classification Search

CPC .... G08G 1/0141; G08G 1/0145; G08G 1/056; G08G 1/164; G08G 1/166; G08G 1/167

See application file for complete search history.

(56) References Cited

U.S. PATENT DOCUMENTS

| | | | | |
|---|---|---|---|---|
| 11,355,006 | B1 * | 6/2022 | Cho | G08G 1/096708 |
| 2018/0053141 | A1 * | 2/2018 | Shydo, Jr. | G05D 1/104 |
| 2018/0173237 | A1 * | 6/2018 | Reiley | G05D 1/0061 |
| 2018/0329418 | A1 * | 11/2018 | Baalke | G16Z 99/00 |
| 2019/0196482 | A1 * | 6/2019 | Reiley | G05D 1/0214 |
| 2019/0324459 | A1 * | 10/2019 | Baalke | G05D 1/0246 |
| 2021/0404813 | A1 * | 12/2021 | Fasola | G01S 17/931 |
| 2023/0221127 | A1 * | 7/2023 | Fasola | G05D 1/246 701/450 |

FOREIGN PATENT DOCUMENTS

| | | | |
|---|---|---|---|
| JP | 2011198142 | A | 10/2011 |
| JP | 2014225151 | A | 12/2014 |
| JP | 2019087037 | A | 6/2019 |

* cited by examiner

*Primary Examiner* — Sisay Yacob

(74) *Attorney, Agent, or Firm* — Dickinson Wright, PLLC

(57) ABSTRACT

A control device includes: a control unit that performs control to make a pedestrian crossing appear in an area from a first side to a second side of a road when a pedestrian crosses the road, and that detects at least one vehicle passing through the road; and a communication unit that transmits instruction data instructing the at least one vehicle detected by the control unit to avoid a position that hinders crossing of the pedestrian.

18 Claims, 11 Drawing Sheets

CONTROL DEVICE AND PEDESTRIAN SUPPORT METHOD

CROSS-REFERENCE TO RELATED APPLICATION

This application claims priority to Japanese Patent Application No. 2021-134392 filed on Aug. 19, 2021, incorporated herein by reference in its entirety.

BACKGROUND

1. Technical Field

The present disclosure relates to a control device and a pedestrian support method.

2. Description of Related Art

Japanese Unexamined Patent Application Publication No. 2014-225151 (JP 2014-225151 A) discloses a device that transmits a stop request signal to a vehicle approaching a road portion corresponding to a crossing candidate area including a point that has been determined that a pedestrian may cross.

SUMMARY

On a congested roadway, a situation may occur where at least one vehicle covers a pedestrian crossing from one end to the other end in a traveling direction of the vehicle. In other words, a situation may occur where at least one vehicle completely covers the pedestrian crossing in the traveling direction. In such a situation, a pedestrian cannot walk on the pedestrian crossing to cross the roadway.

An object of the present disclosure is to facilitate walking on a pedestrian crossing to cross a road.

A control device according to the present disclosure includes: a control unit that performs control to make a pedestrian crossing appear in an area from a first side to a second side of a road when a pedestrian crosses the road, and that detects at least one vehicle passing through the road; and a communication unit that transmits instruction data instructing the at least one vehicle detected by the control unit to avoid a position that hinders crossing of the pedestrian.

A pedestrian support method according to the present disclosure is a pedestrian support method for causing a pedestrian crossing to appear in an area from a first side to a second side of a road when a pedestrian crosses the road, and includes: detection of at least one vehicle passing through the road; and transmission of instruction data instructing the at least one vehicle that has been detected to avoid a position that hinders crossing of the pedestrian.

According to the present disclosure, it is easier for the pedestrian to walk on the pedestrian crossing to cross the road.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described below with reference to the drawings.

In each drawing, the same or corresponding portions are denoted by the same reference signs. In the description of each embodiment, description of the same or corresponding components will be appropriately omitted or simplified.

An embodiment of the present disclosure will be described.

The configuration of a system 10 according to the present embodiment will be described with reference to FIGS. 1 to 3.

Figure 1:
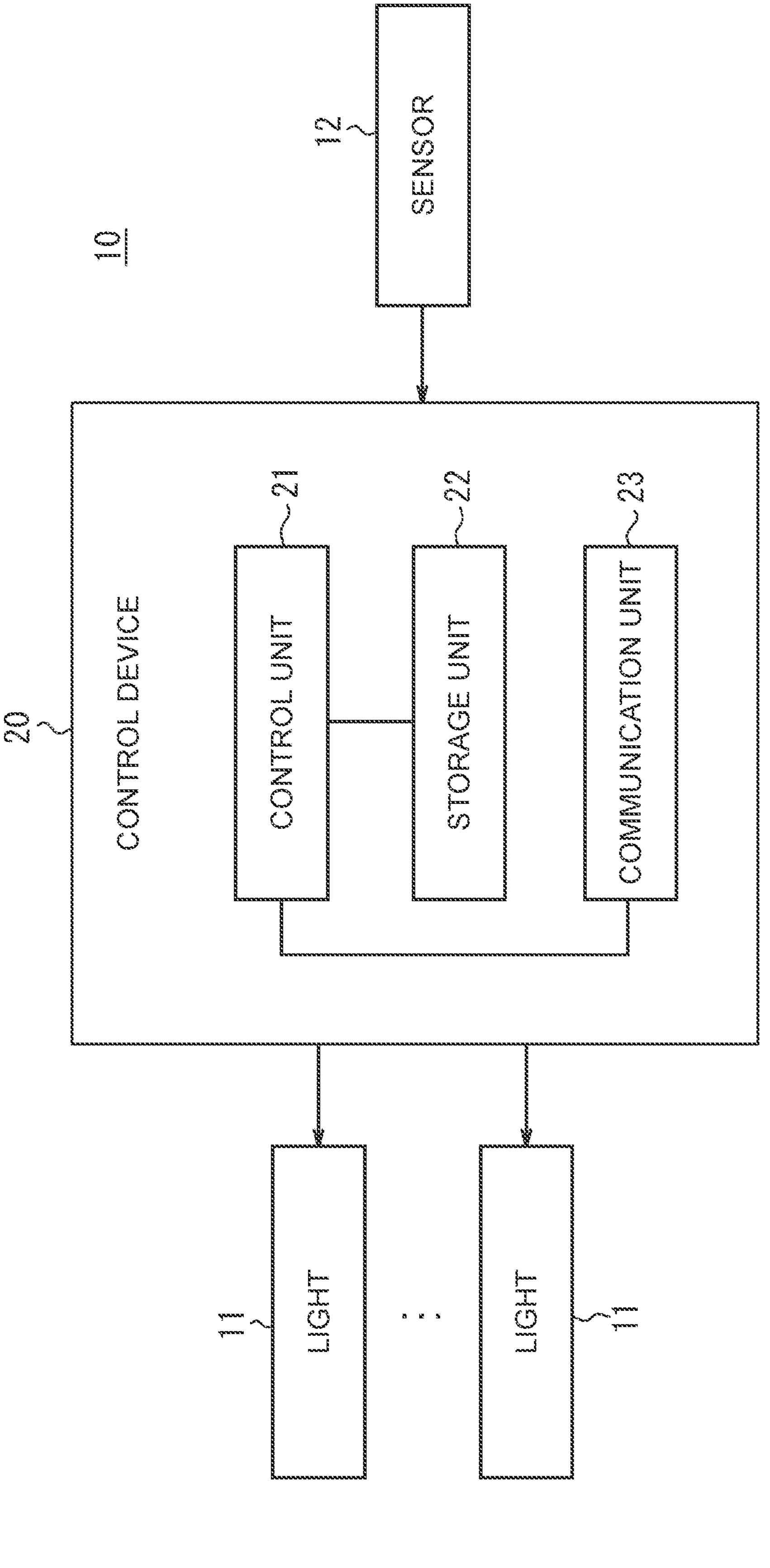
FIG. 1 is a diagram showing a configuration of a system according to an embodiment of the present disclosure.

As shown in FIG. 1, the system 10 according to the present embodiment includes a plurality of lights 11, a sensor 12, and a control device 20. The control device 20 can communicate with the lights 11 and the sensor 12 via a network such as LAN or the Internet or a dedicated line, or wirelessly. The term “LAN” is an abbreviation for “local area network”.

Figure 2:
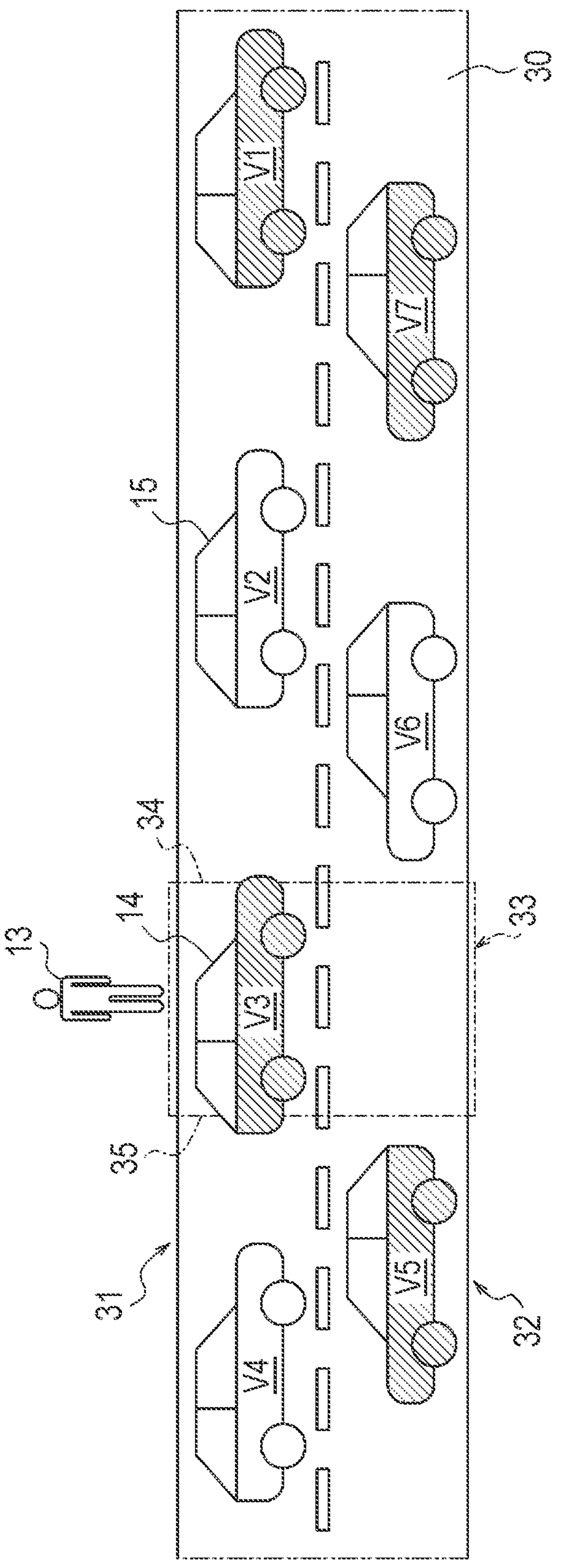
FIG. 2 is a diagram showing a position of each vehicle before an instruction in a first example.
Figure 3:
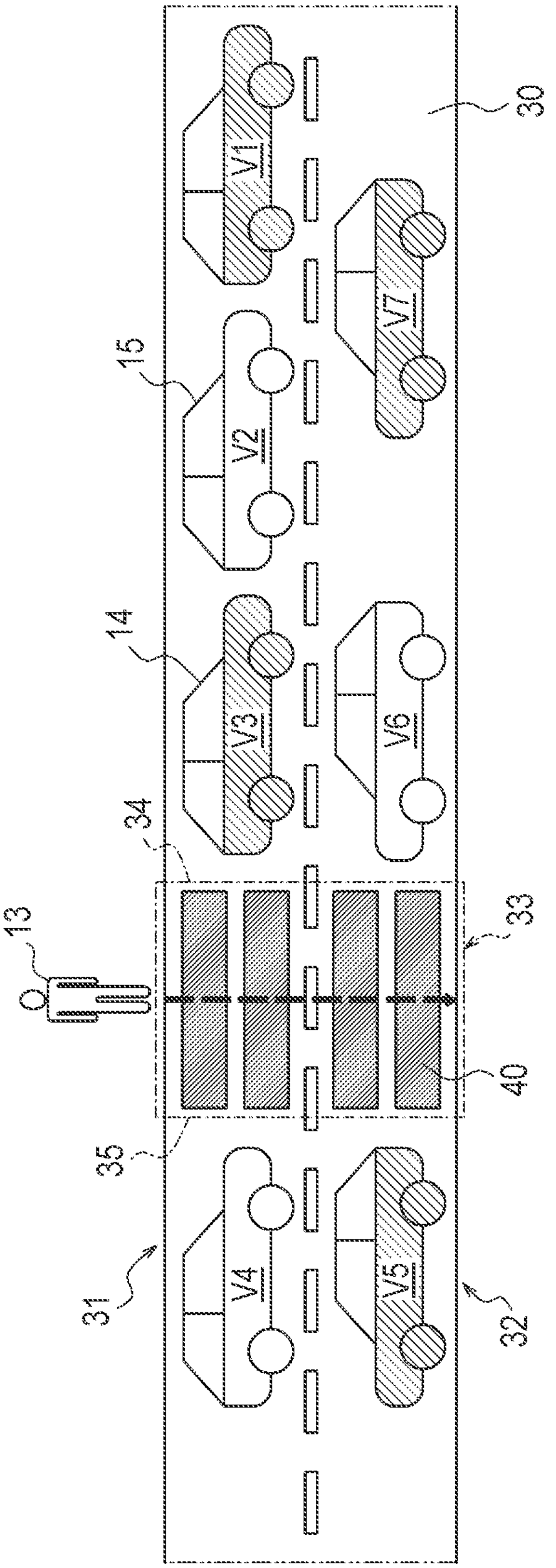
FIG. 3 is a diagram showing the position of each vehicle after the instruction in the first example.

The lights 11 are installed on a road 30 as shown in FIGS. 2 and 3. In the present embodiment, the lights 11 are embedded in the road 30 so as not to protrude from the road surface, but may be embedded in the road 30 so as to protrude from the road surface or may be mounted on the road surface. The lights 11 display the pedestrian crossing 40 by being turned on. Each light 11 includes at least one light emitting element. The light emitting element is, for example, an LED or a laser diode. The term “LED” is an abbreviation for “light emitting diode”.

In the present embodiment, a plurality of small areas arranged along the width direction of the road 30 is set in an area 33 from a first side 31 to a second side 32 of the road 30. For example, as shown in FIG. 3, assuming that four rectangular areas are set as the small areas, the lights 11 are distributed and installed in these four rectangular areas. In each rectangular area, a point light source group or a rectangular surface light source is disposed as each light 11. The number of the small areas is not limited to four and may be changed as appropriate. The shape of each small area is not limited to a rectangle and may be changed as appropriate. As a modification of the present embodiment, the plurality of the small areas may not be set in the area 33, and the lights 11 may be installed in only one place or the entirety of the area 33. Alternatively, instead of the lights 11, a light such as a single surface light source may be installed in only one place or the entirety of the area 33.

The sensor 12 is installed at a point where at least one vehicle 14 passing through a pedestrian 13 and the road 30 can be imaged, such as a point in the vicinity of the road 30. The sensor 12 is, for example, a camera, radar, or LiDAR. The term "LiDAR" is an abbreviation for light detection and ranging.

The control device 20 may be installed on the road 30, may be installed in the vicinity of the road 30, or may be installed in a remote location.

The control device 20 performs control to make the pedestrian crossing 40 appear in the area 33 from the first side 31 to the second side 32 of the road 30 when the pedestrian 13 crosses the road 30. The area 33 corresponds to a crossing candidate area. The control device 20 detects the at least one vehicle 14 passing through the road 30. The control device 20 transmits first instruction data D1 to the at least one vehicle 14 that has been detected. The first instruction data D1 is data instructing to avoid a position that hinders the crossing of the pedestrian 13.

According to the present embodiment, the vehicle 14 can be prompted to avoid a position that hinders the crossing of the pedestrian 13. This makes it easier for the pedestrian 13 to walk on the pedestrian crossing 40 to cross the road 30.

As a first example, it is assumed that the road 30 is congested as shown in FIG. 2. In the first example, a vehicle V1, a vehicle V2, a vehicle V3, and a vehicle V4 are passing on a lane on the first side 31 of the road 30. A vehicle V5, a vehicle V6, and a vehicle V7 are passing on the opposite lane on the second side 32 of the road 30. The pedestrian 13 is about to cross the road 30 from the first side 31 to the second side 32. As the area 33, the control device 20 specifies a rectangular area having a constant width centered on a straight line extending from a point where the pedestrian 13 is located to the second side 32 along the width direction of the road 30. In the first example, the vehicle V3 completely covers the area 33 in the traveling direction. In this situation, the pedestrian 13 cannot walk on the pedestrian crossing 40 to cross the road 30. Therefore, the control device 20 transmits the first instruction data D1 to the vehicle V3 and then performs control to display the pedestrian crossing 40 in the area 33. As shown in FIG. 3, the vehicle V3 moves away from the area 33 in accordance with the first instruction data D1. As a result, the pedestrian 13 can walk on the pedestrian crossing 40 to cross the road 30. In the first example, the control device 20 transmits the first instruction data D1 before the pedestrian crossing 40 is displayed, but the control device 20 may transmit the first instruction data D1 after the pedestrian crossing 40 is displayed.

Figure 4:
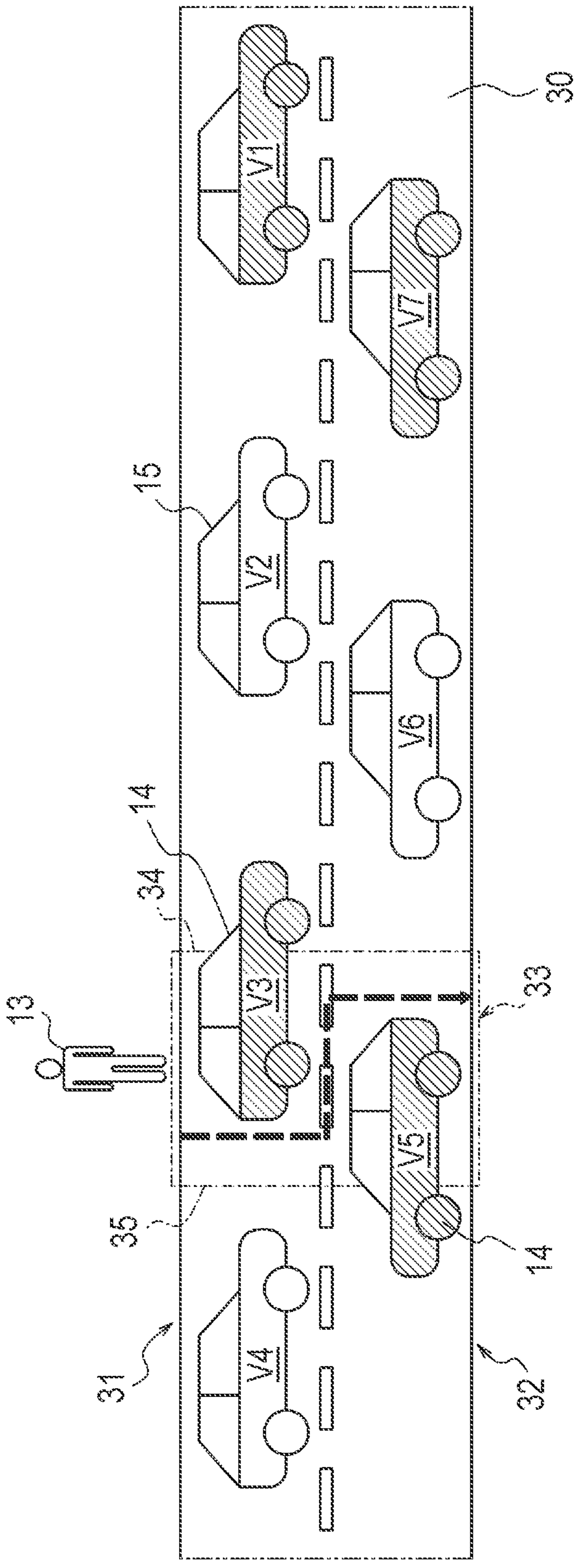
FIG. 4 is a diagram showing a position of each vehicle before an instruction in a second example.
Figure 5:
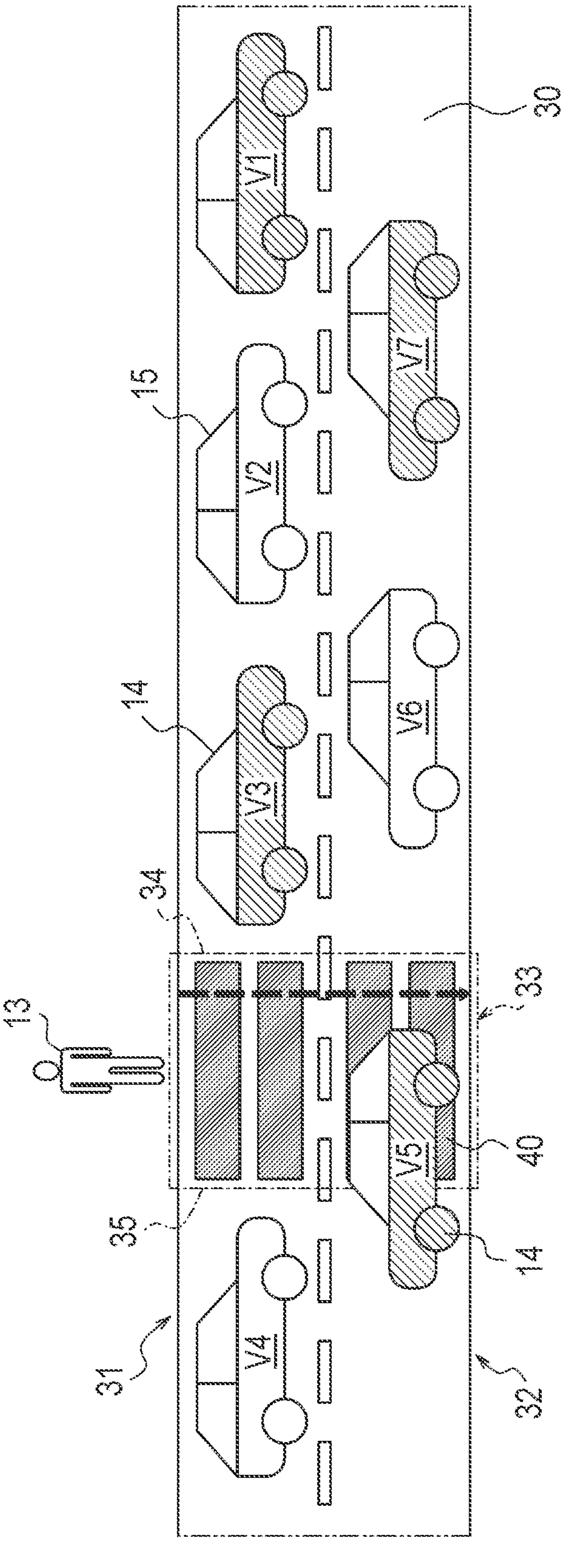
FIG. 5 is a diagram showing the position of each vehicle after the instruction in the second example.
Figure 6:
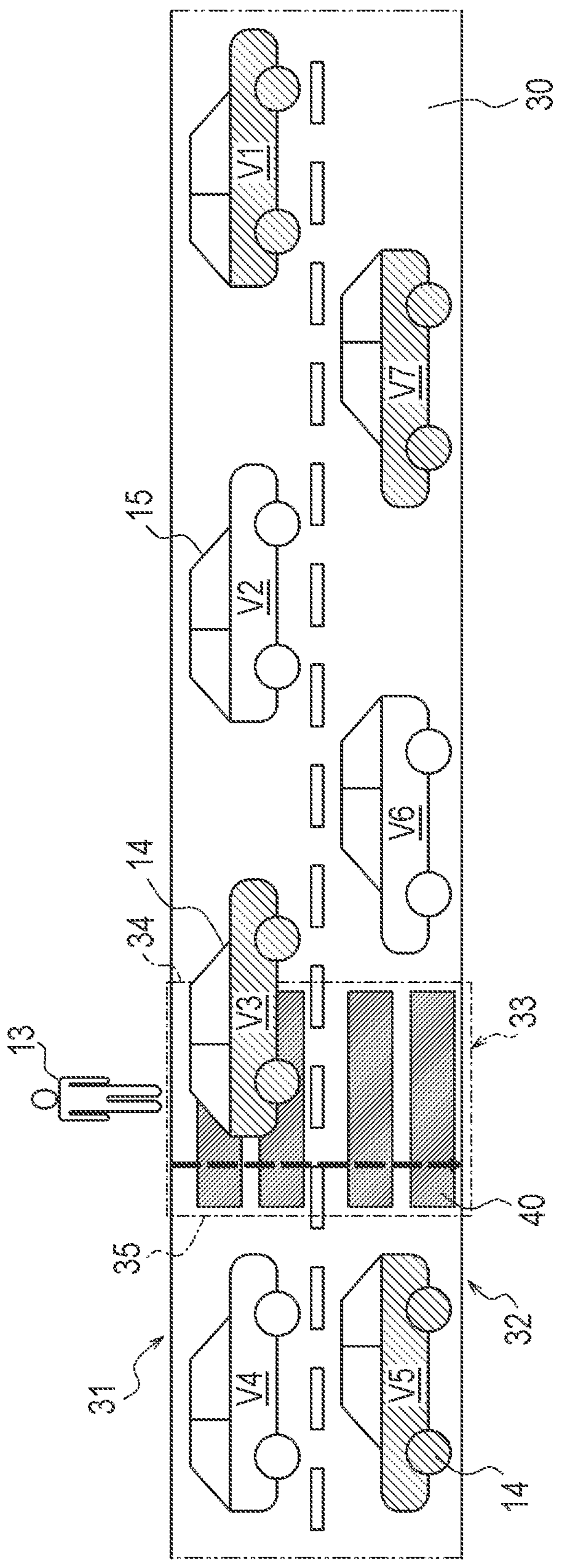
FIG. 6 is a diagram showing the position of each vehicle after another instruction in the second example.
Figure 7:
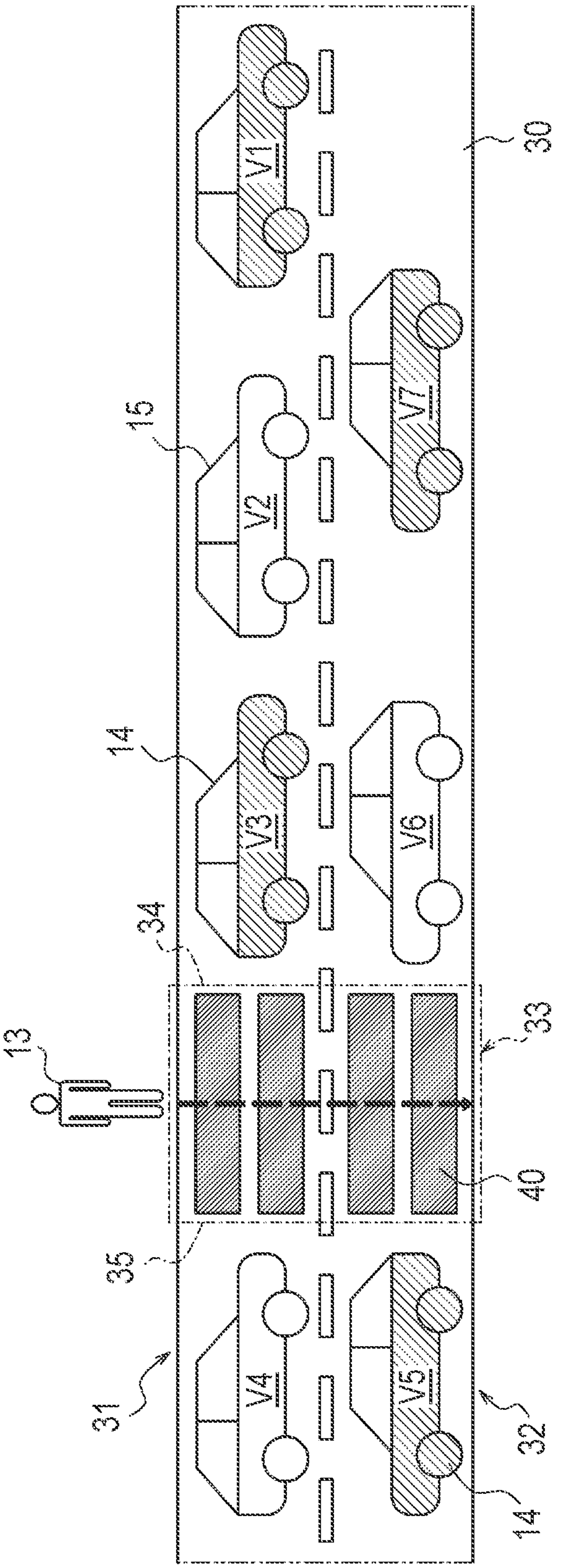
FIG. 7 is a diagram showing the position of each vehicle after still another instruction in the second example.

As a second example, it is assumed that the road 30 is congested as shown in FIG. 4. As in the first example, in the second example, the vehicle V1, the vehicle V2, the vehicle V3, and the vehicle V4 are passing on the lane on the first side 31 of the road 30. The vehicle V5, the vehicle V6, and the vehicle V7 are passing on the opposite lane on the second side 32 of the road 30. The pedestrian 13 is about to cross the road 30 from the first side 31 to the second side 32. As the area 33, the control device 20 specifies a rectangular area having a constant width centered on a straight line extending from a point where the pedestrian 13 is located to the second side 32 along the width direction of the road 30. Unlike the first example, in the second example, the vehicle V3 and the vehicle V5 overlap the area 33 in a positional relationship that keeps the pedestrian 13 from crossing the road 30 in a straight line. In this situation, the pedestrian 13 must walk on the pedestrian crossing 40 in a zig-zag manner to cross the road 30. Therefore, the control device 20 transmits the first instruction data D1 to the vehicle V3, the vehicle V5, or both of the vehicles V3, V5 and then performs control to display the pedestrian crossing 40 in the area 33. As shown in FIG. 5, the vehicle V3 moves away from the area 33 in accordance with the first instruction data D1. Alternatively, as shown in FIG. 6, the vehicle V5 moves away from the area 33 in accordance with the first instruction data D1. Alternatively, as shown in FIG. 7, the vehicle V3 and the vehicle V5 move away from the area 33 in accordance with the first instruction data D1. As a result, the pedestrian 13 can walk on the pedestrian crossing 40 in a straight line to cross the road 30. In the second example, the control device 20 transmits the first instruction data D1 before the pedestrian crossing 40 is displayed, but the control device 20 may transmit the first instruction data D1 after the pedestrian crossing 40 is displayed.

As shown in FIG. 1, the control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". The control unit 21 performs processes related to the operation of the control device 20 while controlling each unit of the control device 20.

The storage unit 22 includes at least one semiconductor memory, at least one magnetic memory, at least one optical memory, or any combination thereof. The semiconductor memory is, for example, a RAM or a ROM. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The storage unit 22 functions as, for example, a main storage device, an auxiliary storage device, or a cache memory. The storage unit 22 stores data used for the operation of the control device 20 and data acquired through the operation of the control device 20.

The communication unit 23 includes at least one communication interface. The communication interface is, for example, a LAN interface, an interface compatible with mobile communication standards such as LTE, the 4G standard, or the 5G standard, or an interface compatible with short-range wireless communication standards such as Bluetooth (registered trademark). The term "LTE" is an abbreviation for "long term evolution". The term "4G" is an abbreviation for "fourth generation". The term "5G" is an abbreviation for "fifth generation". The communication unit 23 receives the data used for the operation of the control device 20, and transmits the data acquired through the operation of the control device 20.

The function of the control device 20 is realized by executing the program according to the present embodiment with the processor serving as the control unit 21. That is, the function of the control device 20 is realized by software. The program causes the computer to perform the operation of the control device 20 such that the computer functions as the control device 20. That is, the computer functions as the control device 20 by performing the operation of the control device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

A part or all of the functions of the control device 20 may be realized by a programmable circuit or a dedicated circuit as the control unit 21. That is, a part or all of the functions of the control device 20 may be realized by hardware.

The configuration of the system 10 according to the present embodiment will be described with reference to FIG. 8. This operation corresponds to the pedestrian support method according to the present embodiment. The operation of the control device 20 included in this operation corresponds to the control method according to the present embodiment.

In step S101, the control unit 21 of the control device 20 determines whether the pedestrian 13 is about to cross the road 30 from the first side 31 to the second side 32 when the pedestrian 13 is on the first side 31 of the road 30. This process may be executed by any procedure, but in the present embodiment, the process is executed by the following procedure.

The sensor 12 captures an image of at least the first side 31 of the road 30. The communication unit 23 of the control device 20 receives the image captured by the sensor 12. The control unit 21 of the control device 20 acquires the image received by the communication unit 23. By analyzing the acquired image, the control unit 21 determines whether the pedestrian 13 is on the first side 31 of the road 30, and the pedestrian 13 is about to cross the road 30 from the first side 31 to the second side 32. As a method of image analysis, a known method can be used. Machine learning such as deep learning may be used. Specifically, when the pedestrian 13 on the first side 31 has not moved for a certain period of time or more while facing the road 30, the control unit 21 determines that the pedestrian 13 is about to cross the road 30 from the first side 31 to the second side 32. Alternatively, when the pedestrian 13 on the first side 31 makes a gesture such as raising a hand, the control unit 21 determines that the pedestrian 13 is about to cross the road 30 from the first side 31 to the second side 32.

When it is determined that the pedestrian 13 is not on the first side 31 of the road 30 or the pedestrian 13 is not about to cross the road 30 from the first side 31 to the second side 32, that is, when a pedestrian that is about to cross the road 30 from the first side 31 to the second side 32 is not detected, the process of step S101 is executed again. When it is determined that the pedestrian 13 is about to cross the road 30 from the first side 31 to the second side 32, that is, when a pedestrian that is about to cross the road 30 from the first side 31 to the second side 32 is detected, the process of step S102 is executed.

In step S102, the control unit 21 of the control device 20 determines whether the at least one vehicle 14 passing through the road 30 is hindering the crossing of the pedestrian 13. This process may be executed by any procedure, but in the present embodiment, the process is executed by the following procedure.

The sensor 12 captures an image of the road 30. The communication unit 23 of the control device 20 receives the image captured by the sensor 12. The control unit 21 of the control device 20 acquires the image received by the communication unit 23. By analyzing the acquired image, the control unit 21 determines whether the at least one vehicle 14 is hindering the crossing of the pedestrian 13. The control unit 21 may analyze the image acquired in step S101. In that case, imaging can be omitted in step S102. As a method of image analysis, a known method can be used. Machine learning such as deep learning may be used. Specifically, when the at least one vehicle 14 is located on the area 33 from the first side 31 to the second side 32 of the road 30, the control unit 21 determines that the at least one vehicle 14 is hindering the crossing of the pedestrian 13. In the first example, as shown in FIG. 2, the vehicle V3 covers the area 33 from a first end 34 to a second end 35 in the traveling direction. Therefore, the control unit 21 determines that the vehicle V3 is completely hindering the crossing of the pedestrian 13. In the second example, as shown in FIG. 4, a plurality of vehicles including the vehicle V3 and the vehicle V5 is in a positional relationship that hinders the pedestrian 13 from crossing the road 30 in a straight line. Therefore, the control unit 21 determines that one or more vehicles included in the plurality of vehicles, that is, the vehicle V3, the vehicle V5, or both of the vehicles V3, V5 is/are hindering the smooth crossing of the pedestrian 13.

When it is determined that the at least one vehicle 14 is not hindering the crossing of the pedestrian 13, that is, when the vehicle hindering the crossing of the pedestrian 13 is not detected, the process of step S106 is executed. When it is determined that the at least one vehicle 14 is hindering the crossing of the pedestrian 13, that is, when the vehicle hindering the crossing of the pedestrian 13 is detected, the process of step S103 is executed. In the first example, since it is determined that the vehicle V3 is completely hindering the crossing of the pedestrian 13, the process of step S103 is executed. Also in the second example, since it is determined that the vehicle V3, the vehicle V5, or both of the vehicles V3, V5 is/are hindering the smooth crossing of the pedestrian 13, the process of step S103 is executed.

In step S103, the control unit 21 of the control device 20 determines whether a preceding vehicle 15 passing through the road 30 in front of the at least one vehicle 14 is hindering forward movement of the at least one vehicle 14. This process may be executed by any procedure, but in the present embodiment, the process is executed by the following procedure.

The sensor 12 captures an image of the road 30. The communication unit 23 of the control device 20 receives the image captured by the sensor 12. The control unit 21 of the control device 20 acquires the image received by the communication unit 23. By analyzing the acquired image, the control unit 21 determines whether the preceding vehicle 15 is hindering the forward movement of the at least one vehicle 14. The control unit 21 may analyze the image acquired in step S101 or step S102. In that case, imaging can be omitted in step S103. As a method of image analysis, a known method can be used. Machine learning such as deep learning may be used. In the first example, as shown in FIG. 2, since the distance between the vehicle V2 and the first end 34 of the area 33 is shorter than the total length of the vehicle V3, the vehicle V3 cannot move ahead of the area 33 while the vehicle V2 is stopped. Therefore, the control unit 21 determines that the vehicle V2 is hindering the forward movement of the vehicle V3. Also in the second example, as shown in FIG. 4, since the distance between the vehicle V2 and the first end 34 of the area 33 is shorter than the total length of the vehicle V3, the vehicle V3 cannot move ahead of the area 33 while the vehicle V2 is stopped. Therefore, the control unit 21 determines that the vehicle V2 is hindering the forward movement of the vehicle V3. In the opposite lane, the space existing from the second end 35 of the area 33 along the traveling direction is longer than the total length of the vehicle V5, so that the vehicle V5 can move ahead of the area 33. Therefore, the control unit 21 determines that there is no preceding vehicle that is hindering the forward movement of the vehicle V5.

When it is determined that the preceding vehicle 15 is not hindering the forward movement of the at least one vehicle 14, that is, when the preceding vehicle that is hindering the forward movement of the at least one vehicle 14 is not detected, the process of step S105 is executed. When it is determined that the preceding vehicle 15 is hindering the forward movement of the at least one vehicle 14, that is, when the preceding vehicle that is hindering the forward movement of the at least one vehicle 14 is detected, the process of step S104 is executed. In the first example and the second example, since it is determined that the vehicle V2 is hindering the forward movement of the vehicle V3, the process of step S104 is executed.

In step S104, the control unit 21 of the control device 20 causes the communication unit 23 to transmit second instruction data D2. The second instruction data D2 is data that prompts the preceding vehicle 15 to move forward. The second instruction data D2 may be a message for the driver or a signal for vehicle control. The communication unit 23 transmits the second instruction data D2 to the preceding vehicle 15. The preceding vehicle 15 receives the second instruction data D2. The preceding vehicle 15 moves forward in accordance with the received second instruction data D2. In the first example, as shown in FIG. 3, the vehicle V2 moves forward in accordance with the second instruction data D2 so that the distance between the vehicle V2 and the first end 34 of the area 33 is longer than the total length of the vehicle V3. Also in the second example, as shown in FIG. 5 or FIG. 7, the vehicle V2 moves forward in accordance with the second instruction data D2 so that the distance between the vehicle V2 and the first end 34 of the area 33 is longer than the total length of the vehicle V3.

In step S105, the control unit 21 of the control device 20 causes the communication unit 23 to transmit the first instruction data D1. The first instruction data D1 is data instructing to avoid a position that hinders the crossing of the pedestrian 13. Specifically, the first instruction data D1 is data instructing to move ahead of the area 33. The first instruction data D1 may be a message for the driver or a signal for vehicle control. The communication unit 23 transmits the first instruction data D1 to the at least one vehicle 14. The at least one vehicle 14 receives the first instruction data D1. The at least one vehicle 14 avoids a position that hinders the crossing of the pedestrian 13 in accordance with the received first instruction data D1. Specifically, the at least one vehicle 14 moves ahead of the area 33. In the first example, as shown in FIG. 3, the vehicle V3 moves forward in accordance with the first instruction data D1 so as not to overlap the area 33. Also in the second example, as shown in FIG. 5 or FIG. 7, the vehicle V3 moves forward in accordance with the first instruction data D1 so as not to overlap the area 33. Alternatively, as shown in FIG. 6 or FIG. 7, the vehicle V5 moves forward in accordance with the first instruction data D1 so as not to overlap the area 33.

Even when the preceding vehicle that is hindering the forward movement of the at least one vehicle 14 is detected in step S103, when the lane next to the lane in which the at least one vehicle 14 is located is vacant, the process of step S104 may be skipped. Then, in step S105, as the first instruction data D1, data instructing to move to the next lane and then move ahead of the area 33 may be transmitted. That is, when the lane next to the lane in which the at least one vehicle 14 is located is vacant and the preceding vehicle that is hindering the forward movement of the at least one vehicle 14 is detected, the control unit 21 of the control device 20 may cause the communication unit 23 to transmit data instructing to move to the next lane and then move ahead of the area 33 as the first instruction data D1.

In step S106, the control unit 21 of the control device 20 performs control to make the pedestrian crossing 40 appear in the area 33. Specifically, the control unit 21 performs control to display the pedestrian crossing 40 by turning on the lights 11 as the control to make the pedestrian crossing 40 appear. This process may be executed by any procedure, but in the present embodiment, the process is executed by the following procedure.

The control unit 21 of the control device 20 causes the communication unit 23 to transmit third instruction data D3. The third instruction data D3 is data instructing to turn on the lights 11. The communication unit 23 transmits the third instruction data D3 to the lights 11. The lights 11 receive the third instruction data D3. The lights 11 display the pedestrian crossing 40 by being turned on in accordance with the received third instruction data D3.

After step S106, the control unit 21 of the control device 20 may determine whether the pedestrian 13 has crossed the road 30. For example, the sensor 12 may capture an image of at least the second side 32 of the road 30. The control unit 21 may determine whether the pedestrian 13 has crossed the road 30 by analyzing the image captured by the sensor 12.

After the crossing of the pedestrian 13, the control unit 21 of the control device 20 may hide the pedestrian crossing 40.

For example, the control unit 21 may cause the communication unit 23 to transmit fourth instruction data D4. The fourth instruction data D4 is data instructing to turn off the lights 11. The communication unit 23 may transmit the fourth instruction data D4 to the lights 11. The lights 11 may hide the pedestrian crossing 40 by being turned off in accordance with the received fourth instruction data D4.

As described above, the present embodiment includes a route that allows the pedestrian 13 to cross the road 30 by passing through a space between two or more vehicles located on the congested road 30, and the pedestrian crossing 40 extending from one side of the road 30 to the other side is displayed to the pedestrian 13. The shape of the pedestrian crossing 40 is fixed in the present embodiment, but may be variable. The pedestrian crossing 40 extends orthogonally to the road 30 in the present embodiment, but may extend diagonally to the road 30.

The control unit 21 of the control device 20 instructs the vehicle located ahead of the crossing candidate area for displaying the pedestrian crossing 40 to move forward while appropriately ensuring the balance of the inter-vehicle distance during a traffic congestion. Therefore, according to the present embodiment, the vehicle overlapping with the crossing candidate area can easily move away from the crossing candidate area even during a traffic congestion.

The control unit 21 of the control device 20 instructs the vehicle overlapping the crossing candidate area to move away from the crossing candidate area. Therefore, according to the present embodiment, the pedestrian 13 can easily cross the road 30 by passing through a space between two or more vehicles even in a traffic congestion.

In the present embodiment, the control unit 21 of the control device 20 analyzes the behavior of the pedestrian 13 observed by the sensor 12 to determine whether the pedestrian 13 will cross the road 30. The control unit 21 performs control to make the pedestrian crossing 40 appear when it is determined that the pedestrian 13 will cross the road 30. That is, in the present embodiment, the behavior of the pedestrian 13 is monitored by the sensor 12, and when it is determined that the display of the pedestrian crossing 40 is necessary, the pedestrian crossing 40 is displayed. The position of the pedestrian 13 may be detected by the sensor 12, and the area 33 may be set in accordance with the position.

Instead of automatically determining whether the display of the pedestrian crossing 40 is necessary by the control device 20, the pedestrian 13 may notify the control device 20 as to whether the display of the pedestrian crossing 40 is necessary. In such a modification, a terminal device of the pedestrian 13 transmits request data Dq to the control device 20. The terminal device of the pedestrian 13 is, for example, a mobile device such as a mobile phone, a smartphone, or a tablet. The request data Dq is data that requests the appearance of the pedestrian crossing 40. The communication unit 23 of the control device 20 receives the request data Dq from the terminal device of the pedestrian 13. The control unit 21 of the control device 20 acquires the request data Dq received by the communication unit 23. The control unit 21 performs control to make the pedestrian crossing 40 appear in accordance with the acquired request data Dq. That is, in the present modification, when the destination of the pedestrian 13 is on the opposite side of the road 30 from the side where the pedestrian 13 is located and the terminal device of the pedestrian 13 requests the control device 20 to display the pedestrian crossing 40, the pedestrian crossing 40 is displayed. The position of the pedestrian 13 may be notified from the terminal device of the pedestrian 13 to the control device 20, and the area 33 may be set in accordance with the position.

In the present embodiment, the pedestrian crossing 40 visually appears when the lights 11 are turned on, but as a modification of the present embodiment, a part of the road surface of the road 30 may be raised so that the pedestrian crossing 40 physically appears. That is, the control unit 21 of the control device 20 may perform control to form the pedestrian crossing 40 by raising a part of the road surface of the road 30 as the control to make the pedestrian crossing 40 appear. In such a modification, the control unit 21 performs control to raise the road surfaces of a plurality of small areas that is set in the area 33 from the first side 31 to the second side 32 of the road 30 and that is arranged along the width direction of the road 30. For example, as in the example of FIG. 3, assuming that four rectangular areas are set as the small areas, the pedestrian crossing 40 is formed by raising the road surfaces of these four rectangular areas. In this modification, the lights 11 may be omitted.

As a modification of the present embodiment, the control unit 21 of the control device 20 may instruct a vehicle located in the vicinity of the crossing candidate area to stop so that the vehicle does not overlap the crossing candidate area. For example, the control unit 21 may instruct a vehicle that is driving at a low speed or a vehicle that is located at a distance from the crossing candidate area to the extent that does not cause sudden braking, to stop before the crossing candidate area. Such a modification will be described as another embodiment.

Figure 9:
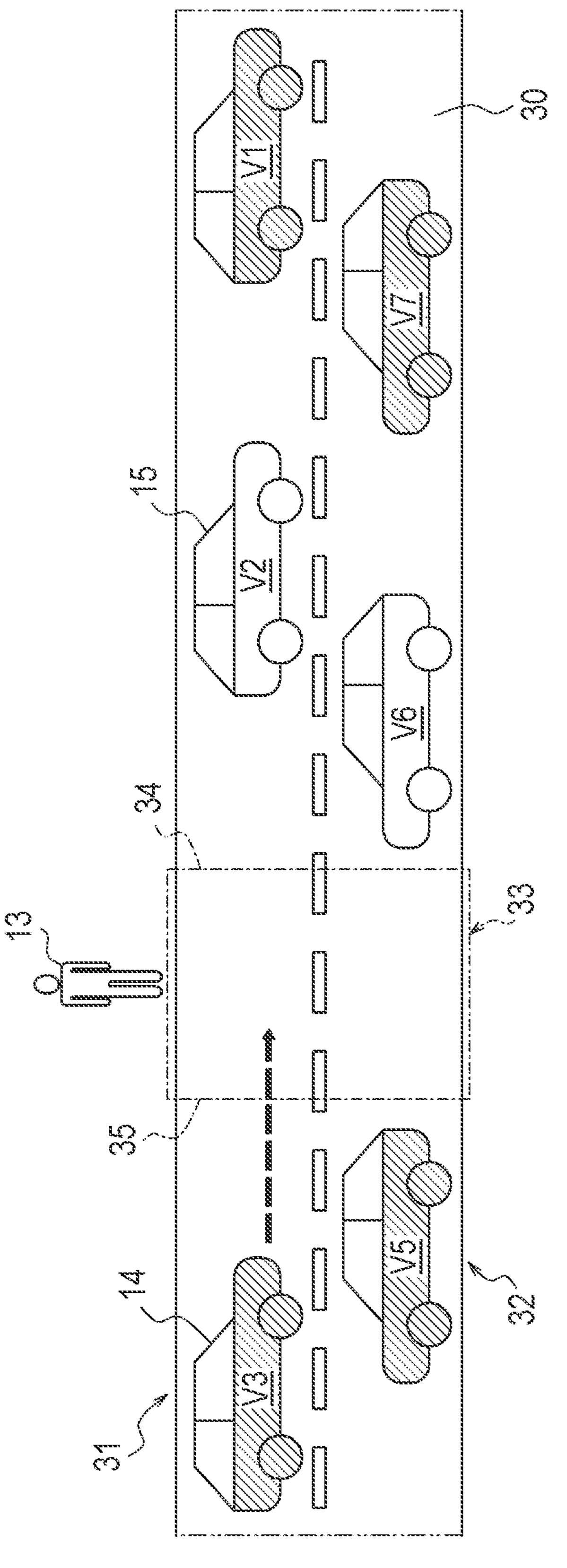
FIG. 9 is a diagram showing a position of each vehicle before an instruction in a third example.
Figure 10:
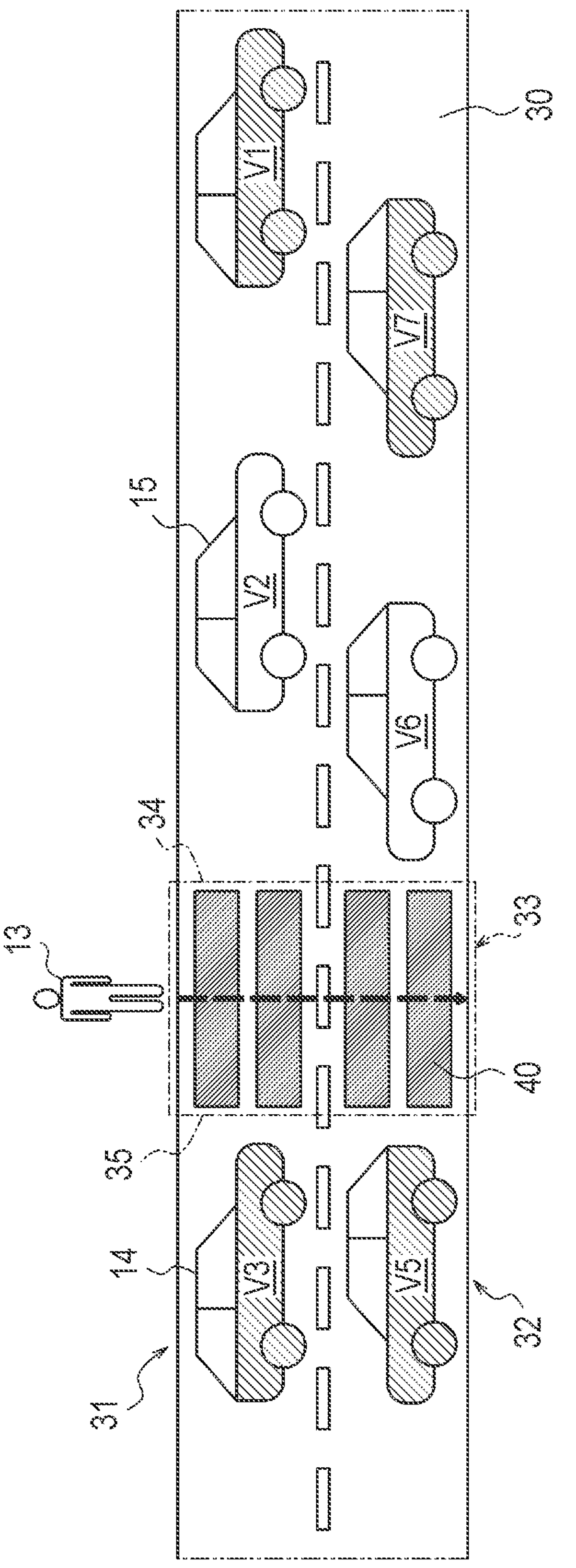
FIG. 10 is a diagram showing the position of each vehicle after the instruction in the third example.

As a third example, it is assumed that the road 30 is congested as shown in FIG. 9. In the third example, the vehicle V1, the vehicle V2, and the vehicle V3 are passing on the lane on the first side 31 of the road 30. The vehicle V5, the vehicle V6, and the vehicle V7 are passing on the opposite lane on the second side 32 of the road 30. The pedestrian 13 is about to cross the road 30 from the first side 31 to the second side 32. As the area 33, the control device 20 specifies a rectangular area having a constant width centered on a straight line extending from a point where the pedestrian 13 is located to the second side 32 along the width direction of the road 30. In the third example, the vehicle V3 is moving toward the area 33. In this situation, the pedestrian 13 cannot walk on the pedestrian crossing 40 to cross the road 30. Therefore, the control device 20 transmits the first instruction data D1 to the vehicle V3 and then performs control to display the pedestrian crossing 40 in the area 33. As shown in FIG. 10, the vehicle V3 stops before the area 33 in accordance with the first instruction data D1. As a result, the pedestrian 13 can walk on the pedestrian crossing 40 to cross the road 30. In the third example, the control device 20 transmits the first instruction data D1 before the pedestrian crossing 40 is displayed, but the control device 20 may transmit the first instruction data D1 after the pedestrian crossing 40 is displayed.

Figure 11:
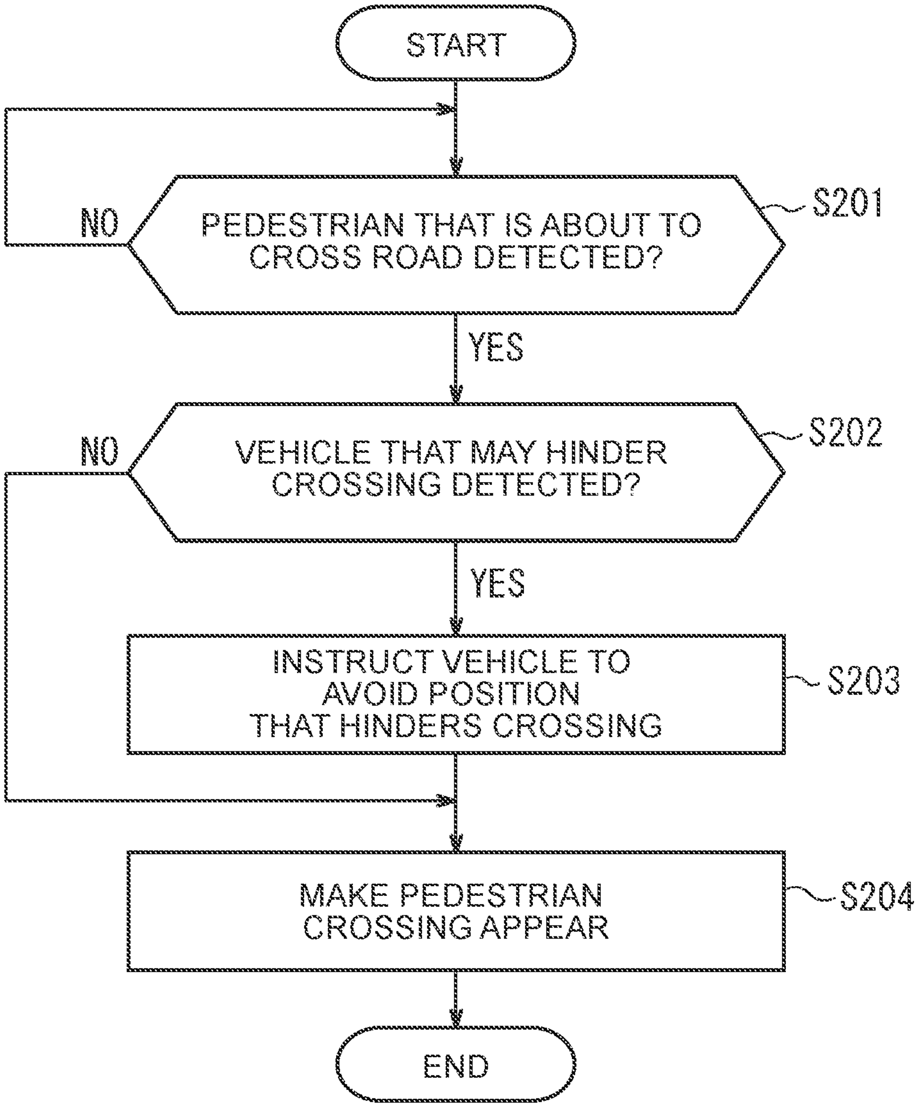
FIG. 11 is a flowchart showing an operation of the system according to a modification of the embodiment of the present disclosure.

The configuration of the system 10 according to the present embodiment will be described with reference to FIG. 11. This operation corresponds to the pedestrian support method according to the present embodiment. The operation of the control device 20 included in this operation corresponds to the control method according to the present embodiment.

Figure 8:
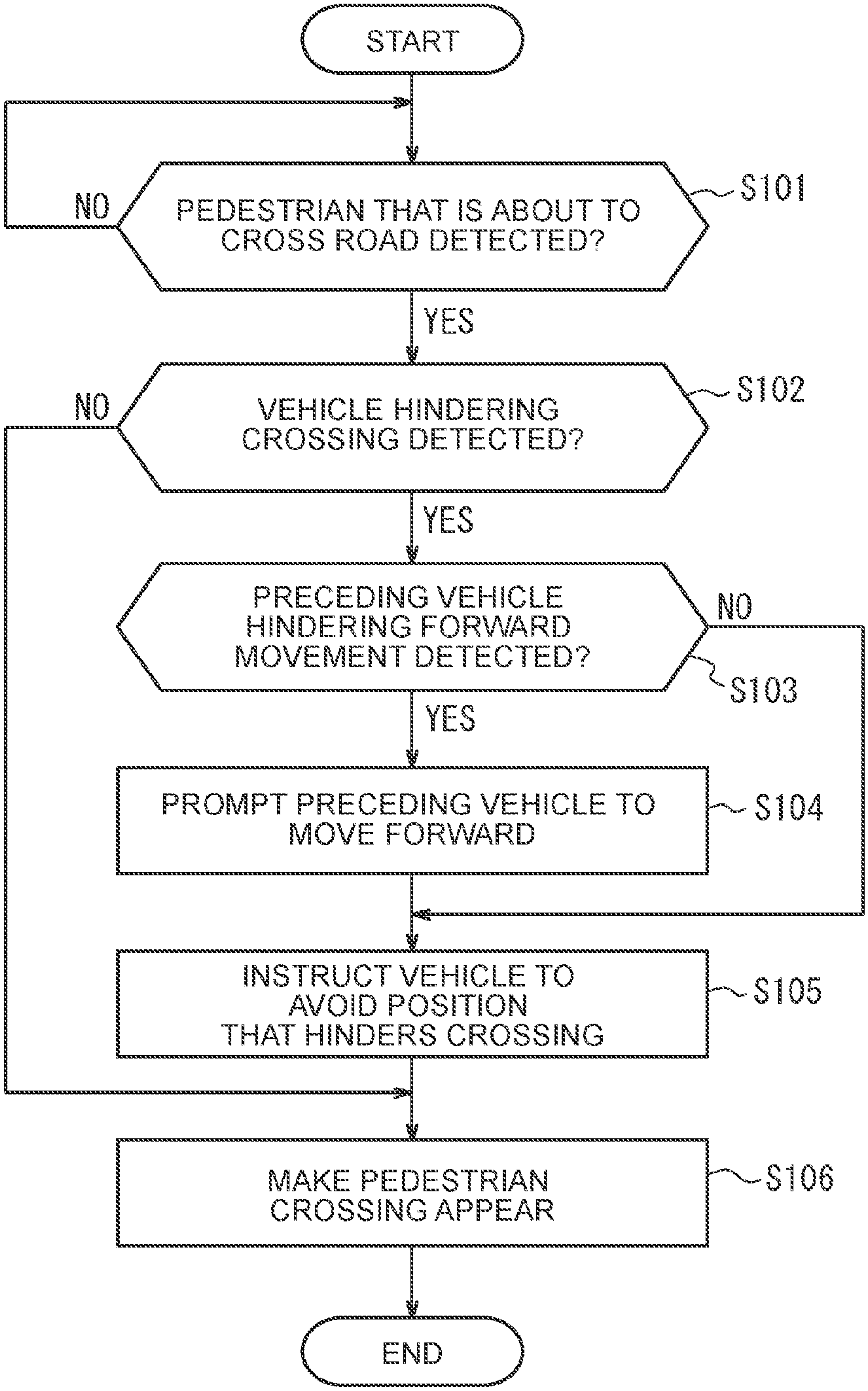
FIG. 8 is a flowchart showing an operation of the system according to the embodiment of the present disclosure.

Since the process of step S201 is the same as the process of step S101 of FIG. 8, the description thereof will be omitted.

In step S202, the control unit 21 of the control device 20 determines whether the at least one vehicle 14 passing through the road 30 may hinder the crossing of the pedestrian 13. This process may be executed by any procedure, but in the present embodiment, the process is executed by the following procedure.

The sensor 12 captures an image of the road 30. The communication unit 23 of the control device 20 receives the image captured by the sensor 12. The control unit 21 of the control device 20 acquires the image received by the communication unit 23. By analyzing the acquired image, the control unit 21 determines whether the at least one vehicle 14 may hinder the crossing of the pedestrian 13. The control unit 21 may analyze the image acquired in step S201. In that case, imaging can be omitted in step S202. As a method of image analysis, a known method can be used. Machine learning such as deep learning may be used. Specifically, when it is predicted that the at least one vehicle 14 will enter the area 33 when the pedestrian crossing 40 appears, the control unit 21 determines that the at least one vehicle 14 may hinder the crossing of the pedestrian 13. In the third example, as shown in FIG. 9, the vehicle V3 is moving toward the area 33. Therefore, the control unit 21 determines that the vehicle V3 may hinder the crossing of the pedestrian 13.

When it is determined that the at least one vehicle 14 will not hinder the crossing of the pedestrian 13, that is, when the vehicle that may hinder the crossing of the pedestrian 13 is not detected, the process of step S204 is executed. When it is determined that the at least one vehicle 14 may hinder the crossing of the pedestrian 13, that is, when the vehicle that may hinder the crossing of the pedestrian 13 is detected, the process of step S203 is executed. In the third example, since it is determined that the vehicle V3 may hinder the crossing of the pedestrian 13, the process of step S203 is executed.

In step S203, the control unit 21 of the control device 20 causes the communication unit 23 to transmit the first instruction data D1. In the present embodiment, the first instruction data D1 is data instructing to stop before the area 33, but may be data instructing to pass through the area 33 before the appearance of the pedestrian crossing 40, or may be data instructing to travel slower than the speed at which the vehicle reaches the area 33 during the appearance of the pedestrian crossing 40. The communication unit 23 transmits the first instruction data D1 to the at least one vehicle 14. The at least one vehicle 14 receives the first instruction data D1. The at least one vehicle 14 avoids a position that hinders the crossing of the pedestrian 13 in accordance with the received first instruction data D1. Specifically, the at least one vehicle 14 stops before the area 33. In the third example, as shown in FIG. 10, the vehicle V3 stops before the area 33 in accordance with the first instruction data D1.

Since the process of step S204 is the same as the process of step S106 of FIG. 8, the description thereof will be omitted.

The present disclosure is not limited to the embodiments described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A control device comprising:

a control unit that performs control to make a pedestrian crossing appear in an area from a first side to a second side of a road when a pedestrian crosses the road, and that detects at least one vehicle passing through the road; and a communication unit that transmits instruction data instructing the at least one vehicle detected by the control unit to avoid a position that hinders crossing of the pedestrian;

wherein the control unit detects a vehicle that covers the area from a first end to a second end in a traveling direction as the at least one vehicle.

2. The control device according to claim 1, wherein:

the control unit detects a vehicle located on the area as the at least one vehicle; and the communication unit transmits data instructing to move ahead of the area as the instruction data.

3. The control device according to claim 1, wherein the control unit detects one or more vehicles included in a plurality of vehicles having a positional relationship that keeps the pedestrian from crossing the road in a straight line as the at least one vehicle.

4. The control device according to claim 1, wherein when the control unit further detects a preceding vehicle that is hindering forward movement of the at least one vehicle, the control unit causes the communication unit to transmit data prompting the preceding vehicle to move forward.

5. The control device according to claim 1, wherein when a lane next to a lane in which the at least one vehicle is located is vacant and the control unit detects a preceding vehicle that is hindering forward movement of the at least one vehicle, the control unit causes the communication unit to transmit data instructing to move to the next lane and then move ahead of the area as the instruction data.

6. The control device according to claim 1, wherein:

the control unit detects a vehicle that is predicted to enter the area when the pedestrian crossing appears as the at least one vehicle; and the communication unit transmits data instructing to pass through the area before the pedestrian crossing appears as the instruction data.

7. The control device according to claim 1, wherein:

the control unit detects a vehicle that is predicted to enter the area when the pedestrian crossing appears as the at least one vehicle; and the communication unit transmits data instructing to stop before the area as the instruction data.

8. The control device according to claim 1, wherein:

the control unit detects a vehicle that is predicted to enter the area when the pedestrian crossing appears as the at least one vehicle; and the communication unit transmits data instructing to travel slower than a speed at which the vehicle reaches the area during appearance of the pedestrian crossing as the instruction data.

9. The control device according to claim 1, wherein the control unit performs control to display the pedestrian crossing by turning on a light installed on the road as the control to make the pedestrian crossing appear.

10. The control device according to claim 1, wherein the control unit performs control to form the pedestrian crossing by raising a part of a road surface of the road as the control to make the pedestrian crossing appear.

11. The control device according to claim 1, wherein the control unit analyzes a behavior of the pedestrian observed by a sensor installed in a vicinity of the road to determine whether the pedestrian will cross the road, and when the control unit determines that the pedestrian will cross the road, the control unit performs the control to make the pedestrian crossing appear.

12. The control device according to claim 1, wherein:

the communication unit receives request data requesting appearance of the pedestrian crossing from a terminal device of the pedestrian; and the control unit performs the control to make the pedestrian crossing appear in accordance with the request data received by the communication unit.

13. A pedestrian support method for causing a pedestrian crossing to appear in an area from a first side to a second side of a road when a pedestrian crosses the road, the pedestrian support method comprising:

detection of at least one vehicle passing through the road; and transmission of instruction data instructing the at least one vehicle that has been detected to avoid a position that hinders crossing of the pedestrian;

wherein the detection includes detecting a vehicle that covers the area from a first end to a second end in a traveling direction as the at least one vehicle.

14. The pedestrian support method according to claim 13, wherein:

the detection includes detecting a vehicle located on the area as the at least one vehicle; and the transmission includes transmitting data instructing to move ahead of the area as the instruction data.

15. The pedestrian support method according to claim 13, wherein the detection includes detecting one or more vehicles included in a plurality of vehicles having a positional relationship that keeps the pedestrian from crossing the road in a straight line as the at least one vehicle.

16. The pedestrian support method according to claim 13, further comprising transmitting data prompting a preceding vehicle to move forward when the preceding vehicle that is hindering forward movement of the at least one vehicle is further detected.

17. The pedestrian support method according to claim 13, wherein the transmission includes, when a lane next to a lane in which the at least one vehicle is located is vacant and a preceding vehicle that is hindering forward movement of the at least one vehicle is detected, transmitting data instructing to move to the next lane and then move ahead of the area as the instruction data.

18. The pedestrian support method according to claim 13, wherein:

the detection includes detecting a vehicle that is predicted to enter the area when the pedestrian crossing appears as the at least one vehicle; and the transmission includes transmitting data instructing to pass through the area before the pedestrian crossing appears, to stop before the area, or to travel slower than a speed at which the vehicle reaches the area during appearance of the pedestrian crossing as the instruction data.

* * * * *